United States Patent [19]

Steiskal et al.

[11] 3,983,983

[45] Oct. 5, 1976

[54] ADJUSTABLE THROW-OUT LEVER ASSEMBLY

[75] Inventors: William L. Steiskal, Lakewood; Duane M. DePuy, Cleveland, both of Ohio

[73] Assignee: W. R. Grace & Co., Columbia, Md.

[22] Filed: June 7, 1974

[21] Appl. No.: 477,339

[52] U.S. Cl. ............................ 192/99 S; 192/111 B
[51] Int. Cl.² ................... F16D 23/00; F16D 13/60
[58] Field of Search ............ 192/99 A, 99 R, 111 B, 192/111 R, 99 S

[56] References Cited
UNITED STATES PATENTS

| | | | |
|---|---|---|---|
| 2,096,151 | 10/1937 | Watt | 192/99 S |
| 2,321,513 | 6/1943 | Reed | 192/99 S |
| 2,501,057 | 3/1950 | Kelleher | 192/111 R |
| 3,213,990 | 10/1965 | Gorelov et al. | 192/111 R X |
| 3,220,524 | 11/1965 | Puidokas | 192/99 S |
| 3,314,511 | 4/1967 | Randol | 192/99 A |
| 3,333,665 | 8/1967 | Einchcomb et al. | 192/99 R |
| 3,406,800 | 10/1968 | Buchanan et al. | 192/111 R X |
| 3,520,388 | 7/1970 | Sink | 192/99 A X |

Primary Examiner—Samuel Scott
Assistant Examiner—Lance W. Chandler
Attorney, Agent, or Firm—William Kovensky; Kenneth E. Prince

[57] ABSTRACT

A throw-out lever assembly for use in a clutch mechanism of a motor vehicle and including a support and a fulcrum assembly mounted on the support. A throw-out lever is operably connected to the fulcrum assembly being adapted at one end for engagement with a clutch actuator and at its opposite end for engagement with a throw-out bearing of the clutch assembly. The fulcrum assembly includes a fulcrum member for pivotally engaging the throw-out lever between its ends. The fulcrum member is adjustably mounted on the support for selectively positioning the throw-out lever in a selected angular orientation with respect to the throw-out bearing for applying an optimum force on the throw-out bearing to disengage the clutch mechanism upon actuation of the clutch actuator.

13 Claims, 2 Drawing Figures

ADJUSTABLE THROW-OUT LEVER ASSEMBLY

BACKGROUND OF THE INVENTION

The present invention relates to clutch mechanisms for motor vehicles, and more particularly, to an adjustable clutch throw-out lever assembly for properly positioning the clutch throw-out lever with respect to the clutch throw-out bearing to facilitate disengagement of the clutch mechanism.

For various reasons, it is often desirable or necessary to replace the various contact parts of a clutch mechanism, or other parts of the motor vehicle associated therewith. For example, it is sometimes desirable to replace the stock clutch parts with more rugged, high performance clutch parts, or when the clutch parts become worn, it is necessary to replace such parts. In any event, when such replacements are made, the physical dimensions of the various parts will necessarily vary from the physical dimensions of the original clutch parts.

Heretofore, the clutch throw-out lever of a clutch assembly was supported on a fixed fulcrum member which was not capable of compensating for the variation in the physical dimensions between the original clutch parts and the replacement clutch parts. Therefore, considerable time and effort was expended to adapt the new clutch parts to the clutch mechanism so as to obtain optimum performance from the clutch mechanism.

Therefore, it has been found extremely desirable to provide an arrangement which could quickly and easily be adjusted to compensate for the variation in the physical dimensions of the replacement clutch parts with the original parts so that their installation can be carried out in a quick and facile manner.

SUMMARY OF THE INVENTION

The present invention contemplates providing an improved clutch throw-out lever assembly, and more particularly, a clutch throw-out lever assembly which is capable of compensating for the variance in physical dimensions between replacement clutch parts and the original clutch parts of or associated with a clutch mechanism. In the present invention, a fulcrum assembly is mounted on a support, such as the bell-housing which encloses the clutch mechanism, and a throw-out lever is operably connected to the fulcrum assembly, being adapted at one end for engagement with a clutch actuator, such as a linkage assembly which is operated by the clutch pedal, and at its opposite end for engagement with the throw-out bearing of the clutch mechanism. The fulcrum assembly includes a fulcrum member which pivotally engages the throw-out lever between its ends. The fulcrum member is adjustably mounted on the support for selectively positioning the throw-out lever in a selected angular orientation with respect to the throw-out bearing for applying an optimum force on a throw-out bearing to disengage the clutch mechanism upon actuation of the clutch actuator. More particularly, the fulcrum assembly includes a base which is detachably mounted on the support, and the fulcrum member is adjustably mounted on the base. The base comprises a sleeve which has an axially extending bore, and the fulcrum member comprises a stud having an enlarged head or base at one end adapted for pivotal engagement with a socket formed in the clutch throw-out lever and an elongated shank at the opposite end adapted for adjustable connection to the base without said bore. The base includes exterior threads which are adapted for threaded engagement with complementary threads formed in the support. The shank includes exterior threads which are adapted for threaded engagement with complementary-shaped threads formed in the bore to enable the head or ball to be moved toward and away from the base, and thus, to enable the fulcrum point between the head and the throw-out lever to be selectively positioned such that a line extending through the fulcrum point and the point of engagement of the throw-out lever with the throw-out bearing extends substantially perpendicular to the central axis of the throw-out bearing.

As can be seen by the foregoing arrangement, the fulcrum point between the throw-out lever and the fulcrum member is selectively positionable in a quick and facile manner so that the throw-out lever can be easily and quickly positioned with respect to the throw-out bearing so as to compensate for the variations in the physical dimensions between replacement clutch parts and the original clutch part being replaced.

DESCRIPTION OF THE PREFERRED EMBODIMENTS

Figure 1:
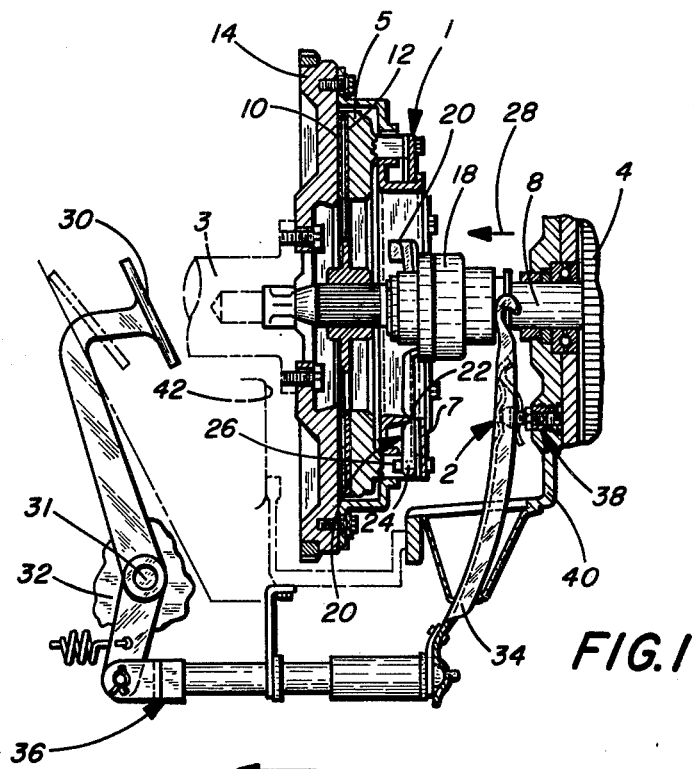
FIG. 1 is a fragmentary, partially in section, side elevation view of a clutch mechanism incorporating the clutch throw-out lever assembly of the present invention.

There is illustrated in FIG. 1, generally at 1, a conventional clutch mechanism 1 which incorporates the adjustable throw-out lever assembly 2 of the present invention, and which is adapted for drivingly connecting the crankshaft 3 to the transmission assembly 4 of a motor vehicle. More particularly, the clutch mechanism 1 includes an annular pressure plate 5 which is biased, such as by a spring 7, toward the engine flywheel 14. The confronting faces of the pressure plate 5 and flywheel 14 are frictionally engaged with one another by annular friction facings 10 and 12 for driving the clutch output shaft 8, which is connected to the transmission 4, when the clutch is engaged.

As further seen in FIG. 1, a throw-out bearing 18 is slidably mounted for axial movement along the shaft 8 being adapted to actuate a plurality of clutch operating levers 20. The clutch operating levers 20 are fulcrumed between their ends, as at 22, having one end, such as their inner end, disposed in engagement with the throw-out bearing 18, and their opposite end, or outer end, pivotally supported, as at 24, to lugs 26 which project rearwardly from the pressure plate 5 such that upon movement of the throw-out bearing in a forward direction, such as indicated by the arrow 28, the pressure plate 5 will be urged out of frictional engagement with the flywheel 14.

To actuate the clutch mechanism 1, a clutch actuator or pedal 30 is pivotally mounted, as at 31, on the vehicle frame 32 being connected to a clutch throw-out lever 34 by a linkage assembly 36. The throw-out lever 34 is fulcrumed between its opposite ends by a fulcrum assembly 38. The fulcrum assembly 38 is mounted on a bellhousing 40 which is in turn mounted on the engine block, as at 42, and encloses the clutch mechanism 1.

The throw-out lever 34 has one end pivotally connected to the linkage assembly 36 by a more or less conventional connector 36a and retaining spring 36b and its opposite end disposed in engagement with the throw-out bearing 18 such that when the pedal 30 is depressed to the actuated position, such as indicated by the phantom lines at 30, the throw-out lever 34 will urge the throw-out bearing 18 forwardly along the shaft 8 to cause the clutch operating lever to disengage the pressure plate 5 from the flywheel 14.

Figure 2:
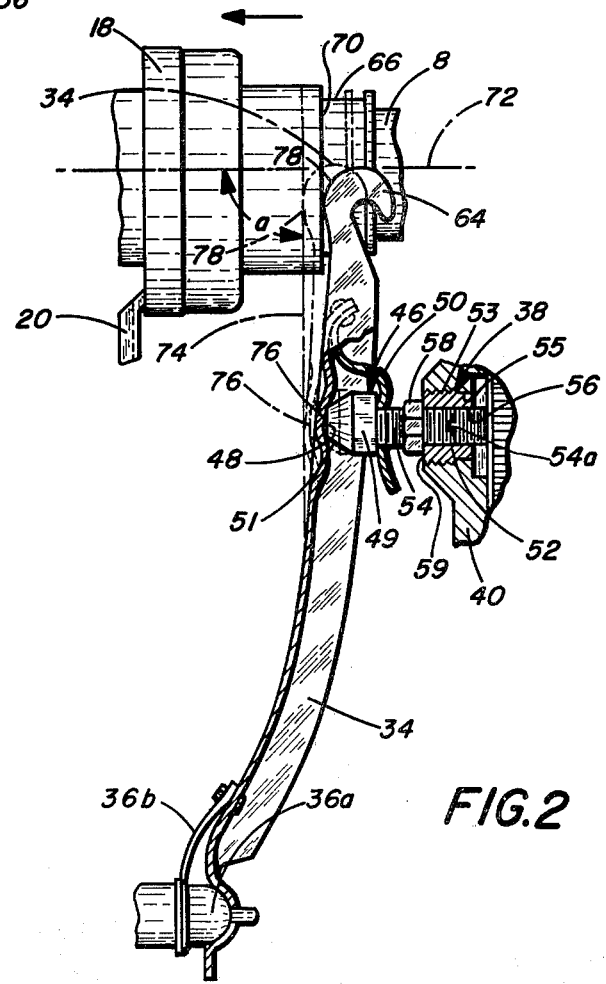
FIG. 2 is an enlarged, side elevation, partially in section view of the clutch throw-out lever assembly of the present invention.

Now in accordance with the present invention, and referring to FIG. 2, the fulcrum assembly 38 is adjustably mounted on the bellhousing 40 to enable the throw-out lever 34 to be positioned in its optimum force applying position with respect to throw-out bearing 18. More particularly, the fulcrum assembly 38 includes a fulcrum member 46 about which the throw-out lever 34 is pivoted upon actuation of the clutch mechanism 1. As shown, the throw-out lever 34 is formed with a socket 48, and the fulcrum member 46 comprises a stud which includes a head, or ball 49, which has a frustro-conically shaped nose 51 which is mounted for pivotal movement within the socket 48. The throw-out lever 34 is connected to the fulcrum member 46 by a leaf spring 50 which engages the side of the head opposite from the nose 51 and resiliently holds the nose 51 within the socket 48. A base 52 is mounted on the bellhousing 40 and supports the fulcrum member 46. More particularly, the base 52 comprises a sleeve which includes exterior threads 53 which are adapted for threaded connection with complementary threads formed in an opening 55 in the wall of the bellhousing 40. The fulcrum member 46 further includes an elongated threaded shank 54 which projects rearwardly from the ball 49 and is threadably inserted within an axially extending threaded bore 56 in the base 52. A nut 58 is threaded on the shank 54 being adapted for locking abutting engagement with the confronting face 59 of the base 52 for securing the fulcrum member 46 in a selected position with respect to the base 52 as will be more fully explained hereinafter.

When the parts of the clutch mechanism 1 are replaced or changed, and the throw-out lever 34 is moved out of its proper angular alignment with the throw-out bearing 18, the foregoing arrangement enables the pivot ball 49 to be manually adjusted by threading the shank 54 into or out of the bore 56, and thus toward and away from the base 52 to move the throw-out lever 34 from a misaligned position, such as is indicated by the solid line position at 34, to its properly aligned position, such as is indicated by the dotted line position at 34. For example, and as is shown at FIG. 2, the desirable or proper angular relationship between the throw-out lever 34 and the throw-out bearing 18 is designated as angle A, such as an angle of approximately 90 degrees. The angle A is defined on one side by the central axis 72 of the throw-out bearing 18 and on its other side by an imaginary line 74 which extends through the fulcrum point 76 between the pivot ball 49 and the throw-out lever 34 and the contact point 78 between the arms 64 and confronting shoulder 70 of the throw-out bearing 18. Thus, in the example shown, it is necessary to adjust the position of the pivot ball 49 so as to move it outwardly, such as indicated by the phantom lines at 49 in FIG. 2, away from the base 52 so that the line 74 is substantially perpendicular to the axis 72. The nut 58 is then threaded along the shank 54 into tight seated, abutting engagement with the face 59 to lock the fulcrum member 46 in the selected position. Thus, when the throw-out lever 34 is in such selected position, the force on the throw-out bearing 18 will be optimized upon initial actuation of the pedal 30.

The shank 54 is formed with a screwdriver slot 54a at its inside end to permit this adjustment. As is conventional, when the invention throw-out lever and fulcrum assembly is retro-fitted, the transmission 4 is first dissembled, dropped in the trade jargon, thus exposing the back or right side of the fulcrum assembly including the slot 54a. Then the head 49 is adjusted to the optimum position as set forth herein with the use of a screwdriver in slot 54a and suitable manipulation of nut 54. The parts are then reassembled and tightened at this selected position, and the retro-fit is complete.

I claim:
1. A throw-out lever assembly for use in a clutch mechanism comprising,
a support,
a fulcrum assembly mounted on said support and comprising a fulcrum member,
a throw-out lever pivotally mounted between its ends on said fulcrum member and having one end adapted for engagement with a clutch actuator and its opposite end adapted for engagement with a throw-out bearing of the clutch mechanism, and
said fulcrum assembly further comprising separate means connected between said fulcrum member and said support to adjustably mount said fulcrum member on said support in a selected stationary position for positioning said throw-out lever in a selected angular orientation with respect to said throw-out bearing,
whereby optimum force may be applied to said throw-out bearing to disengage said clutch mechanism upon actuation of the clutch actuator.

2. A lever assembly in accordance with claim 1, wherein
said fulcrum assembly separate means includes a base detachably mounted on said support, and
said fulcrum member is adjustably mounted on said base.

3. A lever assembly in accordance with claim 2, wherein said fulcrum assembly separate means includes locking means between said base and said fulcrum member
for securing said fulcrum member in a selected position with respect to said base.

4. A lever assembly in accordance with claim 1, wherein said throw-out lever includes a socket, and said fulcrum member comprises a stud having an enlarged frusto-conical head adapted for pivotal engagement with said throw-out lever within said socket.

5. A lever assembly in accordance with claim 2, wherein
said base comprises a sleeve having an axially extending bore, and
said fulcrum member includes an elongated shank adapted for adjustable connection to said base within said bore.

6. A lever assembly in accordance with claim 5, wherein
said sleeve includes exterior threads adapted for threaded engagement with complementary threads formed in said support, and
said shank includes exterior threads adapted for threaded connection with complementary threads within said bore.

7. A lever assembly in accordance with claim 2, wherein said base includes a threaded bore, said fulcrum member includes an enlarged head at one end for pivotal engagement with said throw-out lever, and an elongated threaded shank at its opposite end for threaded connection with complementary threads formed in said bore to enable said fulcrum member to move relative to said base for pivotally supporting said throw-out lever in a selected angular position with respect to said throw-out bearing, and a lock nut threadedly mounted on said shank and adapted for seated, abutting engagement with said base to lock said fulcrum member in a selected position with respect to said base.

8. A lever assembly in accordance with claim 1, wherein said fulcrum member includes a head adapted for fulcrumed support of said throw-out lever between its opposed ends, and said fulcrum member is movable relative to said support for moving said head toward and away from said support to change the position of the fulcrum point between said throw-out lever and said fulcrum member such that an imaginary line extending through the fulcrum and the point of engagement of said throw-out lever with said throw-out bearing is substantially perpendicular to the central axis of the throw-out bearing.

9. A lever assembly in accordance with claim 1, wherein said means to adjustably mount said fulcrum member on said support comprises an elongated shank, said shank being formed with threads cooperable with complementary threads carried by said support, said shank being formed with a screwdriver slot in its end remote from said throw-out lever, and said separate means further comprising a lock nut mounted on said threaded shank and cooperable with said support, whereby said shank is adjusted with respect to said support with the use of a screwdriver in said slot and by manipulation of said lock nut.

10. In a throw-out lever assembly for retro-fitting to a clutch of the type wherein the lever is pivotally mounted on a stationary fulcrum between its ends with one end cooperable with the clutch and the other end cooperable with actuator means for the clutch, and a support for the fulcrum, the improvement comprising a fulcrum member and separate means connected between the fulcrum member and the support to mount said fulcrum member adjustably along a line generally parallel to axis of the clutch, whereby motion of said actuator means and said fulcrumed lever will produce an optimum force to operate said clutch.

11. The combination of claim 10, wherein said fulcrum member comprises a head at one end cooperable with said lever to pivotally mount said lever thereon and an elongated shank, said separate means includes means to mount said shank on said support and a lock nut mounted on said threaded shank between said head and said support, and a screwdriver slot formed in the end of said shank remote from said head.

12. The combination of claim 11, wherein said fulcrum member head is of a frustro-conical shape.

13. The combination of claim 11, said shank being formed with external threads, and said adjustable mounting means further comprising a sleeve interposed between said fulcrum member threaded shank and said support, and said sleeve being formed with internal threads cooperable with said shank threads and with external threads cooperable with complementary threads formed in said support.

* * * * *

UNITED STATES PATENT AND TRADEMARK OFFICE
CERTIFICATE OF CORRECTION

PATENT NO. : 3,983,983
DATED : October 5, 1976
INVENTOR(S) : William L. Steiskal and Duane M. DePuy It is certified that error appears in the above-identified patent and that said Letters Patent are hereby corrected as shown below:

"(73) Assignee: W. R. Grace & Co., Columbia, Md."

to read:

--(73) Assignee: W. R. Grace & Co., New York, New York--

Signed and Sealed this

Twenty-second Day of February 1977

[SEAL]

Attest:

RUTH C. MASON
Attesting Officer

C. MARSHALL DANN
Commissioner of Patents and Trademarks